Aug. 5, 1969    J. H. BERTIN ET AL    3,459,137
VEHICLE DRIVING SYSTEM
Filed March 27, 1967    3 Sheets-Sheet 2
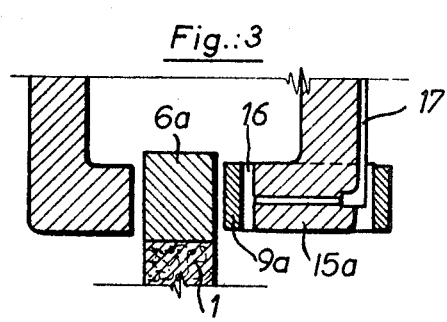
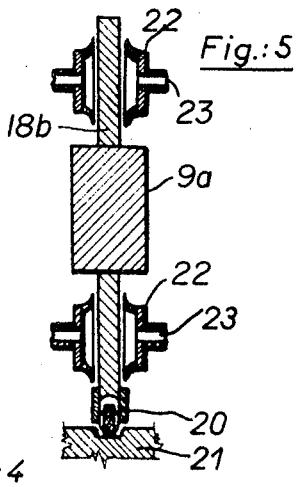
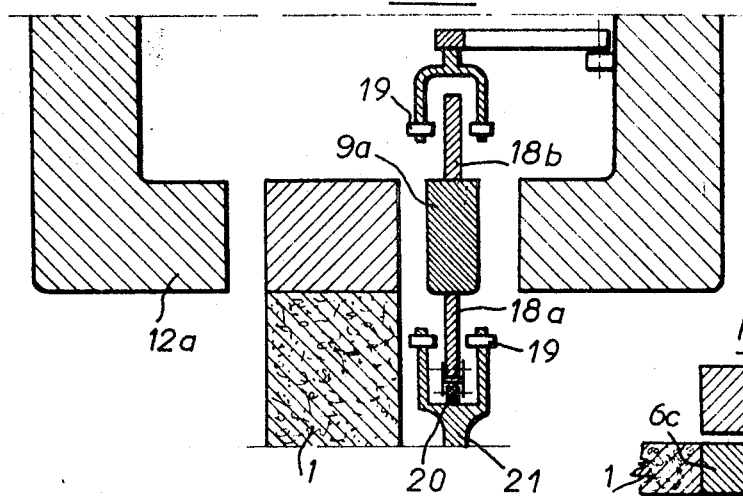
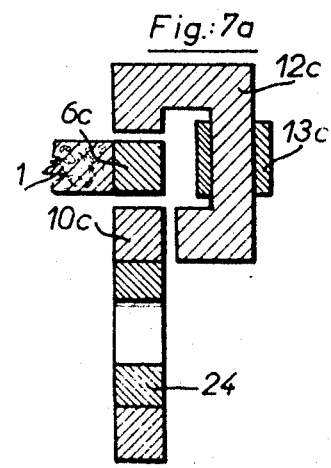
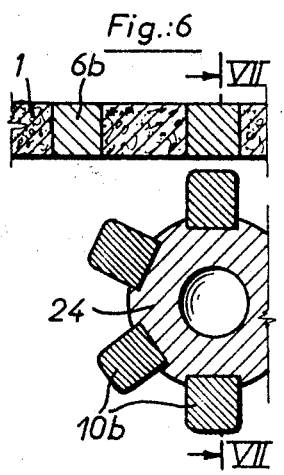
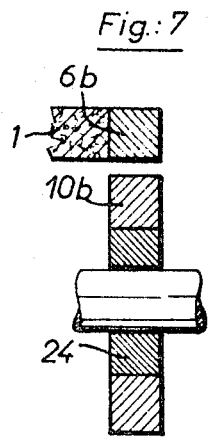

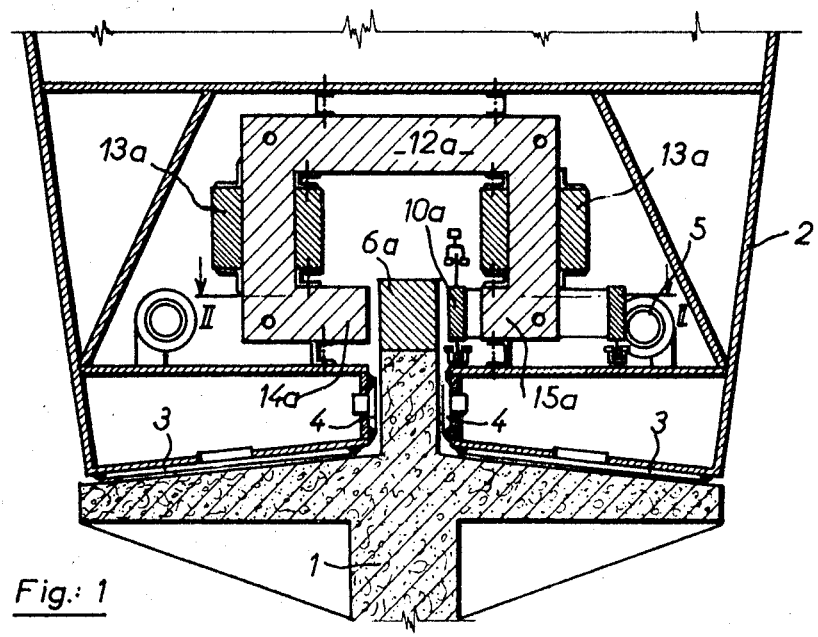
Fig.: 1
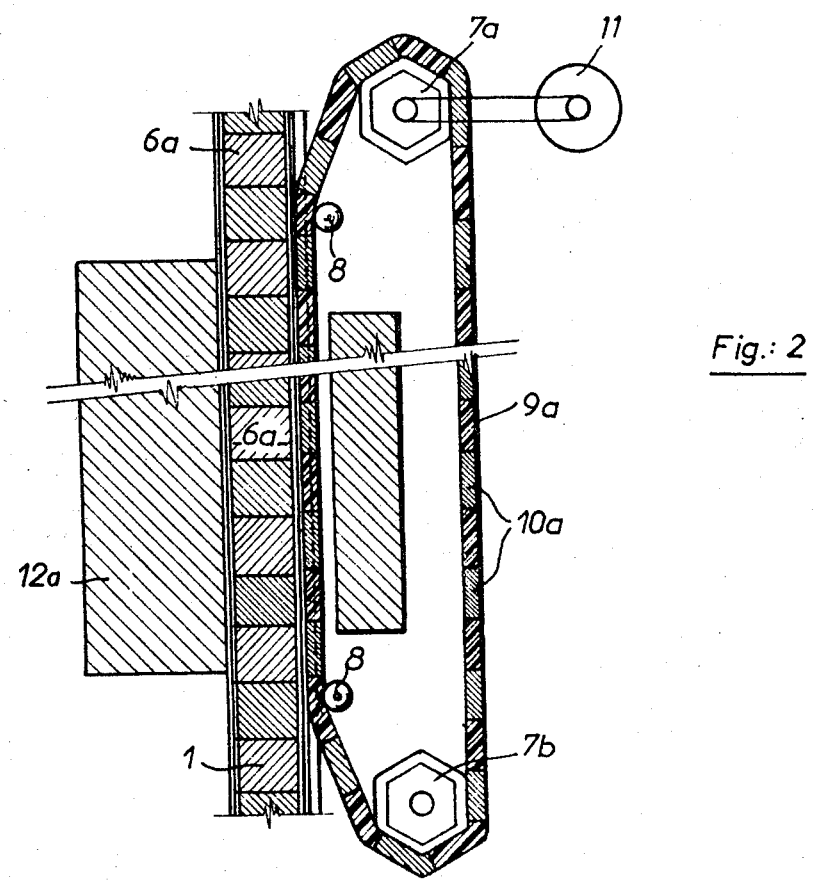
Fig.: 2

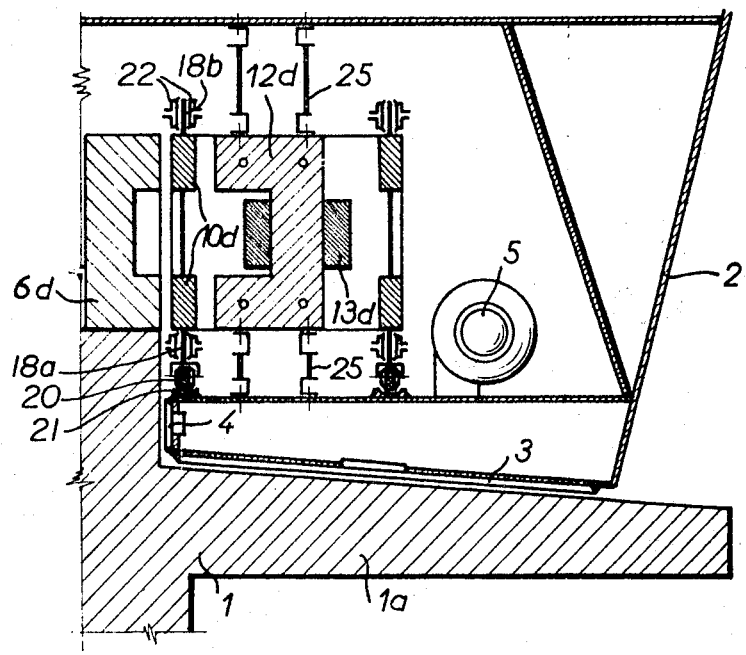
Fig.:8
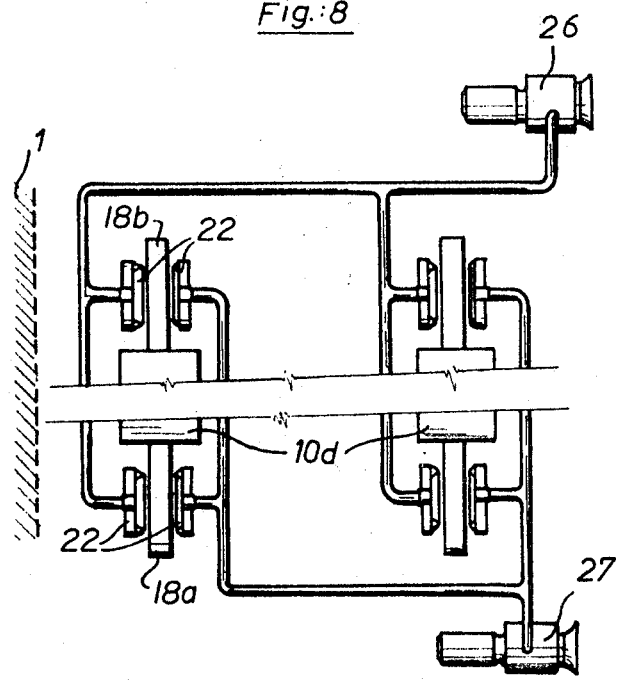
Fig.:9

United States Patent Office 3,459,137
Patented Aug. 5, 1969

3,459,137
VEHICLE DRIVING SYSTEM
Jean Henri Bertin, Neuilly-sur-Seine, Hauts-de-Seine, and Benjamin Jean Marcel Salmon, Suresnes, Hauts-de-Seine, France, assignors to Bertin & Cie, Plaisir, France, a company of France
Filed Mar. 27, 1967, Ser. No. 626,018
Claims priority, application France, Mar. 29, 1966, 55,475
Int. Cl. B61b 13/00
U.S. Cl. 104—148      9 Claims

ABSTRACT OF THE DISCLOSURE

An arrangement for propelling vehicles along a track by means of cooperating magnetic elements facing each other on the vehicle and on the track. The magnetic elements on the vehicle are carried by a driven wheel or chain so that fresh elements are constantly brought into magnetic engagement with further elements on the rail to ensure permanent progression of the vehicle.

---

Our invention has for its object an arrangement for propelling vehicles or movable parts in association with a guiding track.

According to our invention, said arrangement includes in combination a rail adapted to carry and/or to guide a vehicle or the like movable part, said rail being provided at uniform constant intervals with magnetic elements while the vehicle or the like part is also provided in registry with said elements with further magnetic elements which are shifted by suitable driving means so as to allow the movable part or vehicle to progress under the action of the attraction exerted between the magnetic elements on the rail and on the vehicle.

It is also possible to associate with such an arrangement means for guiding the magnetic elements carried by the vehicle and means for maintaining a gap of a constant breadth between the magnetic elements carried on the one hand by the vehicle and on the other hand by the rail The magnetic elements are made either of a hard magnetic material that is a material having a high coercive field with which it is possible to produce permanent magnets or else of a mild ferromagnetic material having a very low coercive field with a large magnetic stability, said material being magnetized by a magnetic field supplied by at least one electromagnet. In the latter case, the magnetic material is advantageously lamellated so as to reduce to a maximum the losses ascribable to eddy currents.

It is also possible to associate the above-described arrangement with a linear asynchronous motor the parts of which are incorporated on the one hand with the rail and on the other hand with the vehicle or the like movable part so as to further the starting of said vehicle or movable part.

According to a first embodiment of our invention, the magnetic elements are constituted by studs subjected to the magnetic field of an electromagnet. The studs forming part of the magnetic elements carried by the vehicle are secured to an endless belt guided by two chain wheels of which at least one is a driving pulley. The electromagnet is carried by the vehicle and is located in a manner such that the studs on the rail and the studs on the portion of the endless belt registering with the rail may lie within the gap of the electromagnet.

According to a second embodiment, the magnetic elements carried by the vehicle are secured to the periphery of a driving wheel carried by the vehicle.

Our improved arrangement allows furthermore braking the vehicle either by holding fast the magnetic elements which are carried by the vehicle or else by shifting said elements in a direction opposed to the direction of progression of the vehicle or again through any other suitable means.

The following description given by way of example and by no means in a limiting sense will allow ascertaining the gist of our invention, reference being made to the accompanying drawings. The features appearing both in the drawings and in the specification form obviously part of our invention.

In said drawings:

FIG. 1 is a transverse cross-section of a first embodiment of our invention;

FIG. 2 is a cross-section through line II—II of FIG. 1;

FIGS. 3 to 5 illustrate arrangements for maintaining constant the breadth of the gap between the magnetic elements carried by the rail and by the vehicle respectively;

FIG. 6 is a sectional view of a second embodiment of our invention;

FIG. 7 is a sectional view of a second embodiment of our invention;

FIG. 7a illustrates a further embodiment;

FIG. 8 illustrates a modification of the first embodiment;

FIG. 9 illustrates diagrammatically the arrangement feeding cushions constituted by compressed fluid adapted to guide the endless belt carrying the magnetic elements of the vehicle illustrated in FIG. 8.

Turning to FIGS. 1 and 2, a rail 1 carries a vehicle 2 of which only the lower portion has been illustrated. The rail 1 in the shape of an inverted T is made of concrete. The vehicle is carried and guided above said rail by cushions of compressed fluid of which the cushions 3 rest on substantially horizontal flanges of the rail so as to carry the vehicle while the cushions 4 engage substantially vertical flanges of the rail, so as to guide the vehicle. The compressed fluid is fed to the cushions by compressors 5.

To the upper edge of the rail are secured studs 6a of ferromagnetic material, said studs being spaced at uniform intervals along the rail. The vehicle carries two chain wheels 7a and 7b round which is wound an endless pivotal link belt 9a carrying magnetic studs 10a. The chain wheel 7a is driven by a motor 11. The spacing between the magnetic studs 10a is equal to that between the magnetic studs 6a carried by the rail. Two tensioning rollers 8 serve for guiding the belt along a path adjacent the rail and for maintaining a substantially constant breadth for the gap between the studs 6a on the rail and the studs 10a on the part of the endless belt facing the rail. An electromagnet provided with an armature 12a and with an energizing winding 13a caps the rail, the studs 6a on the latter and the studs 10a on the endless belt which are located in proximity with the rail.

When the electromagnet is energized with D.C. or with preferably rectified A.C., there is obtained between the two poles 14a and 15a of the electromagnet which face the studs a magnetic field the intensity of which depends on the energization of the electromagnet. When the belt is driven by the motor 11, each magnetic stud 10a on the magnetic belt is positioned in succession in substantial registry with a stud 6a of the rail by which it is attracted. The studs 10a are thus shifted in the direction of progression of the belt by a distance which increases with the inertia of the vehicle until it is released. For suitable forces of inertia, the belt section facing the rail is held fast with reference thereto and the rotation of the driving chain pulley 7a draws the belt section along so as to make the vehicle progress along the rail.

FIG. 3 illustrates an arrangement for stabilizing the position of the belt with reference to the electromagnet armature. According to said arrangement, a layer or at least a cushion of compressed fluid 16 is formed between the endless belt 9a and the pole 15a of the electromagnet armature. The compressed fluid is fed into the gap between the belt and the electromagnet armature. It is necessary for the gap between the endless belt 9a and the armature of the electromagnet to be narrower than the gap between the belt 9a and the magnetic stud 6a on the rail so that the electromagnet armature may exert on said belt an attraction which is more considerable that that exerted by the magnetic studs on the rail. During operation, the gasiform cushion 16 provides for a substantially constant gap between the belt and the electromagnet armature. It is also possible to guide the endless belt by resorting to the arrangement illustrated in FIG. 4. The endless belt 9a carrying studs of ferro-magnetic material extends above and below its main section so as to form the elements 18a and 18b. The section of the belt lying in the gap in the electromagnet is guided between rollers 19 revolving round a vertical axis and providing to each side of the belt a gap of a substantially unvarying breadth. Rollers such as 20 having a horizontal axis ensure the guiding of the belt over a race 21 forming part of the vehicle.

In the case illustrated in FIG. 5, the endless belt is carried as precedingly by a number of rollers 20 bearing on a race 21 forming part of the vehicle. The belt 9a is guided by cushions of compressed fluid contained within bell-shaped members 22 engaging either side of the belt elements 18a and 18b extending above and below the main belt section. The walls of these bell-shaped elements 22 are preferably flexible and the compressed fluid is fed to the cushions starting from a supply of fluid which is not illustrated through channels such as 23.

FIGS. 6 and 7 illustrate a second embodiment of the invention and show a rail 1 provided with magnetic elements 6b constituted by permanent magnets made of ferrite for instance, the poles of a same polarity lying on the same side of the track.

The magnetic elements 10b carried by the vehicle are also constituted by permanent magnets secured to the periphery of a driving wheel 24. Obviously, in order that the magnets 6b may be attracted by the magnets 9b and conversely the magnets 10b should be secured to the wheel 24 in a manner such that their surfaces which are to face the rail during the rotation of said wheel 24 show polarities which are opposed to those of the surfaces of the magnets 6b which are to face them.

FIG. 7a illustrates a modification of said latter embodiment.

The magnets 6b and 10b are replaced by studs of ferromagnetic material and are energized by an electromagnet provided with an armature 12c and an energizing winding 13c. The armature 10c is given the shape illustrated in said FIG. 7a, said shape being such that the studs 6c and 10c may be located within the gap of the electromagnet armature.

FIG. 8 is a sectional view of a modification of the embodiment illustrated in FIG. 1. The vehicle 2 is borne and guided above a track 1 in the shape of an inverted T by cushions of compressed fluid, the cushions such as that illustrated at 3 resting over substantially horizontal flanges of the track 1, while the cushions such as that illustrated at 4 engage substantially vertical flanges of the track. 5 designates means illustrated diagrammatically, which feed said cushions with compressed fluid.

Preferably, the track is provided to either side of its vertical plane of symmetry and at uniform intervals with studs 16d of a lamellated ferromagnetic material, for instance of silicon iron sheets. The armature 12d of an electromagnet and of its energizing winding 13d are secured to the frame of the vehicle by supports 25. The studs 16d may also be provided within at least one of the substantially horizontal sections 1a of the rail 1. The arrangement including the magnetic elements 10d and the electromagnet 12d, 13d is at least partly housed within the chamber in which the cushion 3 is formed.

An endless belt carries the magnetic elements 10d of the vehicle which elements are secured to the lower and upper edges of the belt.

The belt is carried by rollers 20 having a horizontal axis and engaging a race 21. Said belt is guided by means of cushions of a compressed fluid defined by bell-shaped members 22 engaging the sides of the sections 18a and 18b of the belt.

It is of advantage to provide independent feeding means for the fluid cushions engaging the opposite surfaces of the sections 18a and 18b. It is possible for instance to resort for this purpose to the arrangement illustrated in FIG. 9. A compressor 26 feeds the cushions engaging the surfaces of the sections 18a and 18b facing the rail, while another compressor 27 feeds the fluid cushions engaging the opposite surfaces of said sections.

Obviously, the embodiment described has been given solely by way of example and many modifications may be brought thereto within the scope of the accompanying claims, for instance by replacing certain means by technically equivalent means. In particular, when an electromagnet is used for energizing the magnetic elements it is possible to resort to a rail made entirely of a ferro-magnetic material. Similarly, in the case of the embodiment illustrated in FIGS. 1 and 2, it is possible to resort to cylindrical chain wheels provided the studs are pivotally interconnected. Similarly, it is possible to replace the bell-shaped members 22 by fluid bearings. If the latter are provided with sonic throats at the input and output, it is possible to feed all such bearings by means of a single compressor.

What we claim is:

1. A ground effect transportation system comprising a trackway, a succession of like magnetic studs embedded in said trackway and equally spaced longitudinally thereof, a machine movable along said trackway with the interposition of pressure fluid cushions, and a propulsion device carried on said machine to supply motive power thereto, said device comprising a motor driven mechanical carrier bearing an endless succession of like magnetic studs at the same space pitch as the former-mentioned studs and movable with respect to said machine with a peripheral portion of said carrier being adjacent to but spaced from the part of said trackway in which the studs thereof are embedded whereby said studded carrier and said studded trackway are in magnetic cooperation though out of physical contact engagement.

2. Transportation system as claimed in claim 1, wherein said trackway is of the inverted-T section type with a medical upright portion, and the studs thereof are located on said upright portion.

3. Transportation system as claimed in claim 2, wherein said studs are sunken in said upright portion.

4. Transportation system is claimed in claim 2, wherein pressure fluid cushions are formed against said upright portion adjacent the studs thereof, whereby said machine is positively positioned with respect to said studs by said cushions.

5. Transportation system as claimed in claim 1, wherein said studded carrier comprises a toothed wheel, the teeth of which are magnetic studs.

6. Transportation system as claimed in claim 1, wherein said studded carrier comprises an endless belt with studs thereon, guide means for positioning a strip of said belt in close parallel relation with said studded trackway part, two end wheels engaging said belt, and a motor driving one of said wheels.

7. Transportation system as claimed in claim 6, further comprising a stationary race formed in said machine, and roller means in said race for supporting said belt, said roller means being positioned edgewise of said belt.

8. Transportation system as claimed in claim 6, wherein said guide means comprise means for forming fluid cushions against said belt to float said strip thereof in its extension parallel to said trackway part.

9. Transportation system as claimed in claim 8, wherein said fluid cushion forming means comprise sonic input and sonic output throats, and a common compressor feeding the same.

References Cited

UNITED STATES PATENTS

| | | | |
|---|---|---|---|
| 924,498 | 7/1910 | Dean | 104—148 |
| 2,159,814 | 5/1939 | McCune | 105—77 |
| 2,895,429 | 7/1959 | Baermann | 105—77 |
| 3,158,765 | 11/1964 | Polgreen | 104—148 |
| 3,233,559 | 2/1966 | Smith et al. | 104—148 |

ARTHUR L. LA POINT, Primary Examiner

RICHARD A. BERTSCH, Assistant Examiner

U.S. Cl. X.R.

104—23